United States Patent [19]

Victorin

[11] Patent Number: 5,499,389
[45] Date of Patent: Mar. 12, 1996

[54] METHOD OF COMPENSATING THE DEPENDENCE OF THE USEFUL TRANSMITTER SIGNAL ON THE TRANSFER FUNCTION OF A COMBINER FILTER

[75] Inventor: John A. Victorin, Stockholm, Sweden

[73] Assignee: Telefonaktiebolaget LM Ericsson, Stockholm, Sweden

[21] Appl. No.: 293,939

[22] Filed: Aug. 22, 1994

Related U.S. Application Data

[63] Continuation of Ser. No. 897,289, Jun. 11, 1992, abandoned.

[30] Foreign Application Priority Data

Jun. 12, 1991 [SE] Sweden ................................. 9101805

[51] Int. Cl.[6] .................................................. H04B 1/04
[52] U.S. Cl. .......................... 455/119; 455/103; 455/113; 375/296; 332/107
[58] Field of Search ..................................... 455/103, 110, 455/111, 113, 129, 116, 119, 63, 50.1; 375/60, 296; 370/38, 37, 40; 333/165, 166, 167; 332/107, 103

[56] References Cited

U.S. PATENT DOCUMENTS

| | | |
|---|---|---|
| 2,875,283 | 2/1959 | Maione .................................. 333/117 |
| 3,010,035 | 11/1961 | Calvert et al. ......................... 333/166 |
| 4,238,855 | 12/1980 | Zborowski . |
| 4,581,748 | 4/1986 | Sasaki et al. ............................. 375/39 |
| 4,667,172 | 5/1987 | Longshore et al. . |
| 4,868,810 | 9/1989 | Vary et al. . |
| 4,890,300 | 12/1989 | Andrews . |
| 4,896,152 | 1/1990 | Tiemann .................................. 375/60 |
| 4,910,481 | 3/1990 | Sasaki et al. . |
| 5,068,874 | 11/1991 | Leitch ...................................... 375/60 |
| 5,105,445 | 4/1992 | Karam et al. .......................... 332/107 |
| 5,193,222 | 5/1993 | Sasaki ..................................... 455/103 |

OTHER PUBLICATIONS

International–Type Search Report dated Jan. 16, 1992.
"Reference Data for Engineers: Radio, Electronics, Computers and Communications", Howard W. Sams & Co., Inc., p. 23–5, Figure 6.

*Primary Examiner*—Edward F. Urban
*Assistant Examiner*—Doris To
*Attorney, Agent, or Firm*—Burns, Doane, Swecker & Mathis

[57] ABSTRACT

A method of compensating the dependence of the useful transmitter signal on the transfer function of a combiner filter in a mobile radio communication system includes filtering the useful transmitter signal in the base band before it is fed to the combiner filter. This is done in connection with carrier frequency modulation with a filter, the total transfer function of which at least approximately comprises the inverted value of the transfer function of the combiner filter transformed to the base band.

6 Claims, 2 Drawing Sheets

METHOD OF COMPENSATING THE DEPENDENCE OF THE USEFUL TRANSMITTER SIGNAL ON THE TRANSFER FUNCTION OF A COMBINER FILTER

This application is a continuation of application Ser. No. 07/897,289, filed Jun. 11, 1992, now abandoned.

TECHNICAL FIELD

The present invention relates to a method of compensating the dependence of the useful transmitter signal on the transfer function of a combiner filter in a mobile radio communication system.

BACKGROUND OF THE INVENTION

Combiner filters, usually of cavity or dielectric type, are used to connect output signals from several power amplifiers and with different frequencies to a common antenna. The combiner filters are tuned to the frequencies that are used in the respective power amplifiers. Since the transfer functions of the combiner filters are not ideally rectangular unacceptable phase and amplitude distortion of the signal that passes through a combiner filter can arise. As an example the frequency dependent group delay in the combiner filter induces a phase error. Furthermore, the non-constant amplitude response within the modulation band width generates an amplitude pulsation. This means in particular that single pole filters cannot be used if a very large channel distance, that allows wide filters, is not used.

SUMMARY OF THE INVENTION

An object of the present invention is to provide a method of compensating the dependence of the useful transmitter signal on the transfer function of a combiner filter in a mobile radio communication system in such a way that the above phase and amplitude errors can be reduced or eliminated.

In accordance with the present invention this object is achieved filtering the useful transmitter signal in connection with carrier frequency modulation in the base band with a filter, the total transfer function of which at least approximately comprises the inverted value of the transfer function of the combiner filter (COMB) transformed to the base band.

BRIEF DESCRIPTION OF THE DRAWINGS

The invention, together with further objects and advantages thereof, may best be understood by making reference to the following description taken together with the accompanying drawings, in which.

DETAILED DESCRIPTION OF THE PREFERRED EMBODIMENTS

Figure 1:
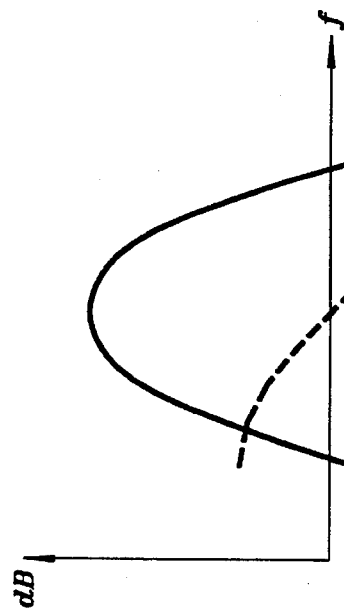
FIG. 1 shows the transfer function of a distortion free combiner filter.

FIG. 1 diagrammatically shows the transfer function of a distortion free combiner filter. This distortion free filter is characterized in that it is a band pass filter with the amplification 1 within the pass band and the amplification 0 outside the pass band. Furthermore, the filter exhibits a phase shift that varies linearly with frequency (the dashed line in FIG. 1). Since the useful transmitter signal is frequency modulated the amplitude and/or phase shifts that correspond to frequency shifts within the pass band will not be distorted by such a distortion free combiner filter.

Figure 2:
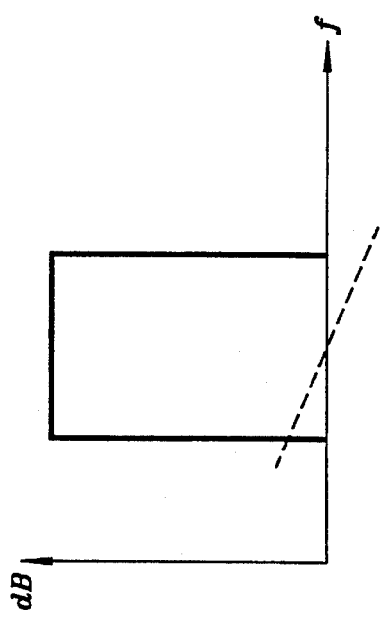
FIG. 2 shows the transfer function of a single pole combiner filter.

However, in practice it is not possible to obtain the distortion free combiner filter of FIG. 1. FIG. 2 shows the transfer function of a combiner filter that is often used in practice, namely a single pole filter. In this case the pass band will contain a varying amplification and also a phase shift that varies non-linearly with frequency (represented by the dashed curve in FIG. 2). For this reason the frequency shifts corresponding to amplitude and/or phase shifts of the useful transmitter signal will lead to distortion of the modulated signal.

However, the distortion caused by the combiner filter is known since the transfer function of the filter is known. Therefore, in accordance with basic idea of the invention, the distortion caused by the combiner filter can be compensated by filtering the transmitter signal before it is fed to the combiner filter, in a filter, the transfer function of which within the frequency range occupied by the transmitter signal at least approximately comprises the inverted value of the combiner filter transfer function within the same frequency range.

Figure 3:
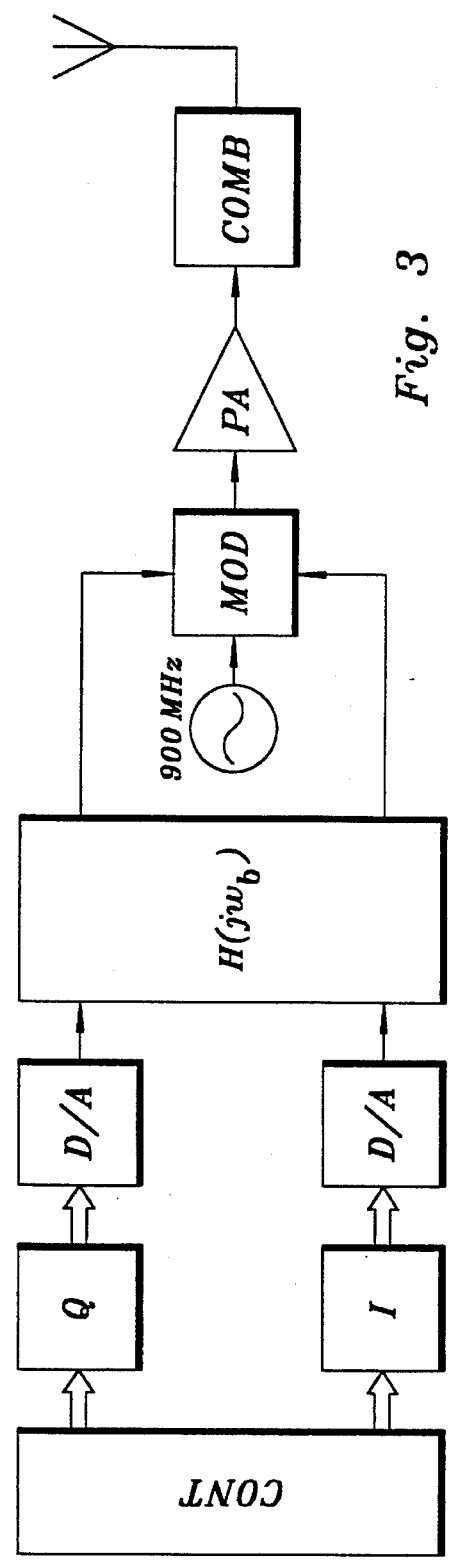
FIG. 3 shows an apparatus for performing a preferred embodiment of the method of the present invention.
Figure 4:
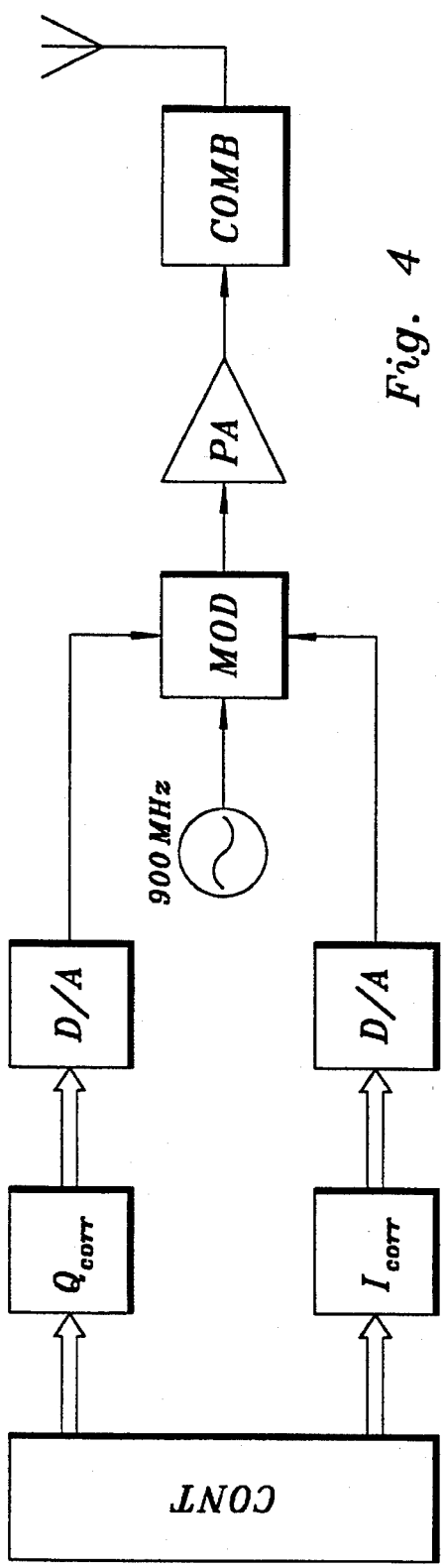
FIG. 4 shows an apparatus for compensating the distortion effects of the combiner filter using the tables $I_{corr}$ and $Q_{corr}$.
Figure 5:
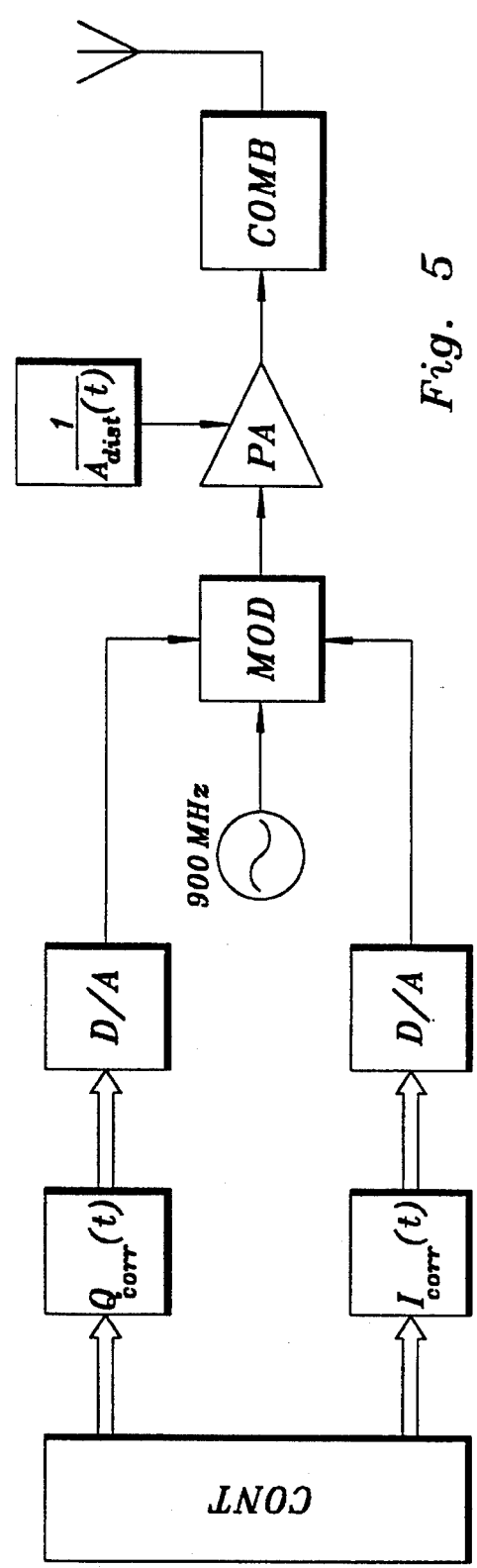
FIG. 5 shows an apparatus for compensating the distortion effects of the combiner filter where the amplitude correction is performed on the power amplifier and the phase correction is performed by table $I_{corr}$ and $Q_{corr}$.

FIG. 3 shows an apparatus for performing a preferred embodiment of the method of the invention.

A controller CONT in the transmitter feeds, in accordance with known phase modulation techniques (see for instance "Reference Data for Engineers: Radio, Electronics, Computers and Communications", Howard W. Sams and Co, Inc., p. 23-5, FIG. 6), blocks of digital signals that are to be recoded for modulation to two PROMs, that in FIG. 3 are designated Q and I. The output signals from these PROMs correspond to a complex number, the phase of which in this embodiment is used for phase modulation. These output signals are converted in respective D/A-converters and fed to a modulator MOD, which is also fed with a carrier signal with a frequency of the order of for instance 900 MHz. The modulated signal is fed to a power amplifier PA and thereafter to the combiner filter COMB and finally to the antenna. The system as described so far works in accordance with known principles.

One possibility to implement the basic idea of the invention would be to insert an inverted filter in accordance with the above between the modulator MOD and the combiner filter COMB. However, since a combiner filter has a transfer function with a narrow peak at a very high frequency (900 MHz in the example) such a solution is hard to implement. For this reason the transfer function of the combiner filter COMB is, in accordance with the invention, first transformed down to the base band of the useful signal. There it will resemble the transfer function of a low pass filter. If the inverted value of the transfer function of this low pass filter is calculated, the transfer function for a high pass filter is obtained. The unmodulated signal can therefore be fed through such a filter to compensate the distortion of the combiner filter.

A derivation of a compensating filter for compensation already in the base band follows below.

Assume that the combiner filter has the transfer function:

$$H_{comb}(j\omega) = \frac{j\omega \frac{\omega_c}{Q}}{(j\omega)^2 + j\omega \frac{\omega_c}{Q} + \omega_c^2}$$

where $\omega$ is the angular frequency of the combiner signal, $\omega_c$ is the angular frequency of the carrier and Q is the Q-value of the combiner filter. Typical values for $\omega_c$ and Q are $2\pi \cdot 900 \cdot 10^6$ rad/s and 2000, respectively.

Sought is a compensating filter with the transfer function $H(j\omega_b)$ that has the same phase and amplitude properties as $1/H_{comb} (j(\omega_b+\omega_c))$, where $\omega_b$ is the base band angular frequency. That is, the sought filter has a transfer function that is formed by the transfer function for the combiner filter transformed to the base band and thereafter inverted. Since in practice $0<\omega_b<2\pi \cdot 200 \cdot 10^3$ rad/s this condition has to be fulfilled only within the given range. In the given example, considering that $\omega_b<<\omega_c$:

$$\begin{aligned}
H_b(j\omega_b) &= \frac{j(\omega_b + \omega_c)\frac{\omega_c}{Q}}{(j(\omega_b + \omega_c))^2 + j(\omega_b + \omega_c)\frac{\omega_c}{Q} + \omega_c^2} = \\
&= \frac{j\frac{\omega_c^2}{Q}\left(1 + \frac{\omega_b}{\omega_c}\right)}{j\frac{\omega_c^2}{Q}\left(1 + \frac{\omega_b}{\omega_c}\right) - 2\omega_b\omega_c\left(1 + \frac{1}{2}\frac{\omega_b}{\omega_c}\right)} \\
&\approx (\omega_b < \omega_c) \approx \frac{j\frac{\omega_c}{Q}}{j\frac{\omega_c}{Q} - 2\omega_b} = \frac{1}{1 + 2jQ\frac{\omega_b}{\omega_c}}
\end{aligned}$$

where $H_b(j\omega_b)$ is the transfer function of the combiner filter transformed to the base band. The sought transfer function $H(j\omega_b)$ can therefore be approximated with:

$$H(j\omega_b) = 1 + 2jQ\frac{\omega_b}{\omega_c}$$

In a preferred embodiment this high pass filter can be implemented by modifying the coding tables I,Q of the carrier modulation in such a way that the filter function is simulated already in the modulation coding (it is to be noted that Q here designates a table and is not to be confused with the Q-value of the filter mentioned above). In this case no further hardware is required. These coding tables are defined in non-corrected form as:

$$I(t) = \cos(\psi(t))$$

$$Q(t) = \sin(\psi(t))$$

where $\psi(t)$ is defined for instance in accordance with European standard GSM 05.04 section 2.5. An example of sampled tables for I,Q can be found at the end of this specification. One row in these tables represents 8 samples during one bit time. The controller CONT chooses one of the 64 rows for each new bit depending on the quadrant in which the modulation is located and on the data content of the new bit and the three last bits. This procedure is standardized and is not an object of this invention.

The above functions are now to be corrected in such a way that the distortion of the combiner filter is compensated. For this reason the instantaneous frequency deviation of the useful signal is defined according to:

$$\omega_i(t) = \frac{d\phi(t)}{dt}$$

Furthermore, the group delay distortion of the combiner filter as a function of the angular frequency is defined as:

$$G_d(\omega) = -\frac{d}{d\omega} arg[H_{comb}(j\omega)]$$

By the substitution $$\omega = \omega_{c+\omega_i}(t)$$

this group delay distortion can be expressed as a function of t, that is as $G_d(t)$. The phase error generated by the combiner filter is thereafter transformed to the base band according to:

$$\psi_{dist}(t) = 2\pi G_d(t)\omega_i(t)$$

The amplitude error generated by a combiner filter is calculated according to the formula:

$$A_{dist}(t) = abs[H_{comb}(\omega_c + \omega_i(t))]$$

Using the above expressions the tables for the corrected I- and Q-values can now be calculated according to:

$$I_{corr}(t) = \frac{\cos[\phi(t) - \phi_{dist}(t)]}{A_{dist}(t)}$$

$$Q_{corr}(t) = \frac{\sin[\phi(t) - \phi_{dist}(t)]}{A_{dist}(t)}$$

Corrected tables corresponding to the above mentioned tables for I,Q can be found at the end of this specification. These tables generate a correction for the above exemplified combiner filter.

Due to the general form of these correction formulas the correction can also be performed in two steps. First a phase correction is performed in the IQ-modulation step. In this case the amplitude correction is performed in the transmitter instead, suitably as late as possible in the same, preferably in the final stage itself. The reason for this is that a normal transmitter often contains several more or less saturated amplifier stages, which would eliminate or reduce the amplitude correction that has been added in the IQ-modulation step. Preferably a final stage with variable amplification that is controlled by the signal $1/A_{dist}(t)$ is used. In this embodiment the I,Q-tables which are only phase corrected, are given by:

$$I_{corr}(t) = \cos[\psi(t) - \psi_{dist}(t)]$$

$$Q_{corr}(t) = \sin[\psi(t) - \psi_{dist}(t)]$$

It is appreciated that the method in accordance with the invention can also be used with multiple pole filters, although the necessity for compensation is less since such filters have a transfer function that is flatter near the central frequency of the filter.

It will be understood by those skilled in the art that various modifications and changes may be made to the present invention without departure from the spirit and scope thereof, which is defined by the appended claims.

| | | | I | | |
|---|---|---|---|---|---|
| -7.1165e-001 | -8.3499e-001 | -9.2629e-001 | -9.9998e-001 | -9.7948e-001 | -8.2779e-001 |
| -7.1157e-001 | -8.3479e-001 | -9.2592e-001 | -1.0000e+000 | -9.8200e-001 | -8.5518e-001 |
| -6.4433e-001 | -7.3922e-001 | -8.0343e-001 | -8.5279e-001 | -8.4417e-001 | -7.6748e-001 |
| -6.4423e-001 | -7.3897e-001 | -8.0283e-001 | -8.4970e-001 | -8.3719e-001 | -7.3398e-001 |
| 7.0909e-001 | 7.7074e-001 | 8.1745e-001 | 8.3245e-001 | 8.3830e-001 | 7.3398e-001 |
| 7.0918e-001 | 7.7097e-001 | 8.1802e-001 | 8.4646e-001 | 8.4525e-001 | 7.6748e-001 |
| 7.7068e-001 | 8.6048e-001 | 9.3505e-001 | 8.5551e-001 | 8.1561e-001 | 8.5518e-001 |
| 7.7076e-001 | 8.6066e-001 | 9.3540e-001 | 9.9998e-001 | 9.3105e-001 | 8.2779e-001 |
| 7.7076e-001 | 8.6066e-001 | 9.3540e-001 | 9.9993e-001 | 9.2110e-001 | 8.2779e-001 |
| 7.7068e-001 | 8.6048e-001 | 9.3505e-001 | 9.9998e-001 | 9.2110e-001 | 8.5518e-001 |
| 7.7097e-001 | 8.4646e-001 | 8.1802e-001 | 8.5551e-001 | 9.3105e-001 | 7.6748e-001 |
| 7.0918e-001 | 8.1802e-001 | 8.1745e-001 | 8.5551e-001 | 8.1561e-001 | 7.3398e-001 |
| 7.0909e-001 | 7.7074e-001 | 8.1745e-001 | 8.5245e-001 | 8.3830e-001 | 7.3398e-001 |
| -6.4423e-001 | -7.3897e-001 | -8.0283e-001 | -8.4970e-001 | -8.3719e-001 | -7.3398e-001 |
| -6.4433e-001 | -7.3922e-001 | -8.0343e-001 | -8.5279e-001 | -8.4417e-001 | -7.6748e-001 |
| -7.1157e-001 | -8.3479e-001 | -9.2592e-001 | -1.0000e+000 | -9.3127e-001 | -8.5518e-001 |
| -7.1165e-001 | -8.3499e-001 | -9.2629e-001 | -9.9998e-001 | -9.2133e-001 | -8.2779e-001 |
| -7.0253e-001 | -5.5026e-001 | -3.7680e-001 | -1.8881e-001 | 2.0152e-003 | 5.6103e-001 |
| -7.0262e-001 | -5.5057e-001 | -3.7772e-001 | -1.9127e-001 | 1.8889e-001 | 5.1833e-001 |
| -7.6475e-001 | -6.7346e-001 | -5.9540e-001 | -5.4252e-001 | -5.3608e-001 | -6.4108e-001 |
| -7.6483e-001 | -6.7373e-001 | -5.9620e-001 | -5.4463e-001 | -5.4691e-001 | -6.7917e-001 |
| -7.0512e-001 | -6.3716e-001 | -5.7600e-001 | -5.2281e-001 | -5.4521e-001 | -6.7917e-001 |
| -7.0503e-001 | -6.3687e-001 | -5.7519e-001 | -5.1778e-001 | -5.3437e-001 | -6.4108e-001 |
| -6.3722e-001 | -5.0949e-001 | -3.5452e-001 | -5.8449e-003 | 1.9089e-001 | 5.1833e-001 |
| -6.3713e-001 | -5.0918e-001 | -3.5359e-001 | -1.1726e-002 | 2.0351e-001 | 5.6103e-001 |
| 6.3713e-001 | 5.0918e-001 | 3.5359e-001 | -1.1726e-002 | -2.0351e-001 | -5.6103e-001 |
| 6.3722e-001 | 5.0949e-001 | 3.5452e-001 | -5.8449e-003 | -1.9089e-001 | -5.1833e-001 |
| 7.0503e-001 | 6.3687e-001 | 5.7519e-001 | 5.1778e-001 | 5.3437e-001 | 6.4108e-001 |
| 7.0512e-001 | 6.3716e-001 | 5.7600e-001 | 5.2281e-001 | 5.4521e-001 | 6.7917e-001 |
| 7.6483e-001 | 6.7373e-001 | 5.9620e-001 | 5.2226e-001 | 5.4691e-001 | 6.4108e-001 |
| 7.6475e-001 | 6.7346e-001 | 5.9540e-001 | 5.4463e-001 | 5.3608e-001 | 5.7909e-001 |
| 7.0262e-001 | 5.5057e-001 | 3.7772e-001 | 1.9127e-001 | -3.6433e-001 | -5.1833e-001 |
| 7.0253e-001 | 5.5026e-001 | 3.7680e-001 | 1.8881e-001 | -1.8889e-001 | -5.6103e-001 |
| 7.1165e-001 | 8.3499e-001 | 9.2629e-001 | 9.9998e-001 | 9.7948e-001 | 8.2779e-001 |
| 7.1157e-001 | 8.3479e-001 | 9.2592e-001 | 1.0000e+000 | 9.8200e-001 | 8.5518e-001 |
| 6.4433e-001 | 7.3922e-001 | 8.0343e-001 | 8.5279e-001 | 8.4417e-001 | 7.6748e-001 |
| 6.4423e-001 | 7.3897e-001 | 8.0283e-001 | 8.4970e-001 | 8.3719e-001 | 7.3398e-001 |
| -7.0909e-001 | -7.7074e-001 | -8.1745e-001 | -8.5245e-001 | -8.3830e-001 | -7.3398e-001 |
| -7.0918e-001 | -7.7097e-001 | -8.1802e-001 | -8.4646e-001 | -8.4525e-001 | -7.6748e-001 |
| -7.7068e-001 | -8.6048e-001 | -9.3505e-001 | -8.5551e-001 | -8.1561e-001 | -8.5518e-001 |
| -7.7076e-001 | -8.6066e-001 | -9.3540e-001 | -9.9998e-001 | -9.3105e-001 | -8.2779e-001 |
| -7.7076e-001 | -8.6066e-001 | -9.3540e-001 | -9.9993e-001 | -9.2110e-001 | -8.2779e-001 |
| -7.7068e-001 | -8.6048e-001 | -9.3505e-001 | -9.9998e-001 | -9.2110e-001 | -8.5518e-001 |
| -7.7097e-001 | -8.4646e-001 | -8.1802e-001 | -8.5551e-001 | -9.3105e-001 | -7.6748e-001 |
| -7.0918e-001 | -8.1802e-001 | -8.1745e-001 | -8.5551e-001 | -8.1561e-001 | -7.3398e-001 |
| -7.0909e-001 | -7.7074e-001 | -8.1745e-001 | -8.5245e-001 | -8.3830e-001 | -7.3398e-001 |
| 6.4423e-001 | 7.3897e-001 | 8.0283e-001 | 8.4970e-001 | 8.3719e-001 | 7.3398e-001 |
| 6.4433e-001 | 7.3922e-001 | 8.0343e-001 | 8.5279e-001 | 8.4417e-001 | 7.6748e-001 |
| 7.1157e-001 | 8.3479e-001 | 9.2592e-001 | 1.0000e+000 | 9.8200e-001 | 8.5518e-001 |
| 7.1165e-001 | 8.3499e-001 | 9.2629e-001 | 9.9998e-001 | 9.7948e-001 | 8.2779e-001 |
| 7.0253e-001 | 5.5026e-001 | 3.7680e-001 | 1.8881e-001 | 9.8370e-001 | 5.6103e-001 |
| 7.0262e-001 | 5.5057e-001 | 3.7772e-001 | 1.9127e-001 | -1.8889e-001 | -5.1833e-001 |

-continued

| | | | | |
|---|---|---|---|---|
| 7.6475e − 001 | 6.7346e − 001 | 5.9540e − 001 | 5.4252e − 001 | 5.2226e − 001 | 5.3608e − 001 | 5.7909e − 001 | 6.4108e − 001 |
| 7.6483e − 001 | 6.7373e − 001 | 5.9620e − 001 | 5.4463e − 001 | 5.2727e − 001 | 5.4691e − 001 | 6.0040e − 001 | 6.7917e − 001 |
| 7.0512e − 001 | 6.3716e − 001 | 5.7600e − 001 | 5.3457e − 001 | 5.2281e − 001 | 5.4521e − 001 | 5.9992e − 001 | 6.7917e − 001 |
| 7.0503e − 001 | 6.3687e − 001 | 5.7519e − 001 | 5.3245e − 001 | 5.1778e − 001 | 5.3437e − 001 | 5.7860e − 001 | 6.4108e − 001 |
| 6.3722e − 001 | 6.0949e − 001 | 3.5452e − 001 | 1.7954e − 001 | −5.8449e − 003 | −1.9089e − 001 | −3.6488e − 001 | −5.1833e − 001 |
| 6.3713e − 001 | 5.0918e − 001 | 3.5359e − 001 | 1.7707e − 001 | −1.1726e − 002 | −2.0351e − 001 | −3.8932e − 001 | −5.6103e − 001 |
| −6.3713e − 001 | −5.0918e − 001 | −3.5359e − 001 | −1.7707e − 001 | 1.1726e − 002 | 2.0351e − 001 | 3.8932e − 001 | 5.6103e − 001 |
| −6.3722e − 001 | −5.0949e − 001 | −3.5452e − 001 | −1.7954e − 001 | 5.8449e − 003 | 1.9089e − 001 | 3.6488e − 001 | 5.1833e − 001 |
| −6.3687e − 001 | −6.3687e − 001 | −5.7519e − 001 | −5.3245e − 001 | −5.1778e − 001 | −5.3437e − 001 | −5.7860e − 001 | −6.4108e − 001 |
| −7.0503e − 001 | −6.3716e − 001 | −5.7600e − 001 | −5.3457e − 001 | −5.2281e − 001 | −5.4521e − 001 | −5.9992e − 001 | −6.7917e − 001 |
| −7.0512e − 001 | −6.7346e − 001 | −5.9540e − 001 | −5.4252e − 001 | −5.2727e − 001 | −5.4691e − 001 | −6.0040e − 001 | −6.7917e − 001 |
| −7.6483e − 001 | −6.7373e − 001 | −5.9620e − 001 | −5.4463e − 001 | −5.2281e − 001 | −5.3608e − 001 | −5.7909e − 001 | −6.4108e − 001 |
| −7.6475e − 001 | −5.5057e − 001 | −3.7772e − 001 | −1.9127e − 001 | 6.0168e − 004 | 1.8889e − 001 | 3.6433e − 001 | 5.1833e − 001 |
| −7.0262e − 001 | −5.5026e − 001 | −3.7680e − 001 | −1.8881e − 001 | 6.4830e − 003 | 2.0152e − 001 | 3.8877e − 001 | 5.6103e − 001 |
| −7.0253e − 001 | | | | | | | |

Q

| | | | | |
|---|---|---|---|---|
| 7.0253e − 001 | 5.5026e − 001 | 3.7680e − 001 | 1.8881e − 001 | −6.4830 e − 003 | −2.0152e − 001 | −3.8877e − 001 | −5.6103e − 001 |
| 7.0262e − 001 | 5.5057e − 001 | 3.7772e − 001 | 1.9127e − 001 | −6.0168e − 004 | −1.8889e − 001 | −3.6433e − 001 | −5.1833e − 001 |
| 7.6475e − 001 | 6.7346e − 001 | 5.9540e − 001 | 5.4252e − 001 | 5.2226e − 001 | 5.3608e − 001 | 5.7909e − 001 | 6.4108e − 001 |
| 7.6483e − 001 | 6.7373e − 001 | 5.9620e − 001 | 5.4463e − 001 | 5.2727e − 001 | 5.4691e − 001 | 6.0040e − 001 | 6.7917e − 001 |
| 7.0512e − 001 | 6.7346e − 001 | 5.7600e − 001 | 5.3457e − 001 | 5.2281e − 001 | 5.4521e − 001 | 5.9992e − 001 | 6.7917e − 001 |
| 7.0503e − 001 | 6.3716e − 001 | 5.7519e − 001 | 5.3245e − 001 | 5.1778e − 001 | 5.3437e − 001 | 5.7860e − 001 | 6.4108e − 001 |
| 6.3722e − 001 | 6.3687e − 001 | 3.5452e − 001 | 1.7954e − 001 | −5.8449e − 003 | −1.9089e − 001 | −3.6488e − 001 | −5.1833e − 001 |
| 6.3713e − 001 | 6.094ge − 001 | 3.5359e − 001 | 1.7707e − 001 | −1.1726e − 002 | −2.0351e − 001 | −3.8932e − 001 | −5.6103e − 001 |
| −6.3713e − 001 | 5.0918e − 001 | −3.5359e − 001 | −1.7707e − 001 | 1.1726e − 002 | 2.0351e − 001 | 3.8932e − 001 | 5.6103e − 001 |
| −6.3722e − 001 | −5.0918e − 001 | −3.5452e − 001 | −1.7954e − 001 | 5.8449e − 003 | 1.9089e − 001 | 3.6488e − 001 | 5.1833e − 001 |
| −6.3687e − 001 | −5.0949e − 001 | −5.7519e − 001 | −5.3245e − 001 | −5.1778e − 001 | −5.3437e − 001 | −5.7860e − 001 | −6.4108e − 001 |
| −7.0503e − 001 | −6.3716e − 001 | −5.7600e − 001 | −5.3457e − 001 | −5.2281e − 001 | −5.4521e − 001 | −5.9992e − 001 | −6.7917e − 001 |
| −7.0512e − 001 | −6.3737e − 001 | −5.9540e − 001 | −5.4463e − 001 | −5.2727e − 001 | −5.4691e − 001 | −6.0040e − 001 | −6.7917e − 001 |
| −7.6483e − 001 | −6.7373e − 001 | −5.9620e − 001 | −5.4252e − 001 | −5.2226e − 001 | −5.3608e − 001 | −5.7909e − 001 | −6.4108e − 001 |
| −7.6475e − 001 | −6.7346e − 001 | −9.2629e − 001 | −9.8154e − 001 | −1.0000 + 000 | −9.7948e − 001 | −9.2133e − 001 | −8.2779e − 001 |
| −7.1165e − 001 | −8.3499e − 001 | −9.2592e − 001 | −9.8154e − 001 | −9.9998e − 001 | −9.7907e − 001 | −9.2110e − 001 | −8.2779e − 001 |
| −7.1157e − 001 | −8.3479e − 001 | −8.0343e − 001 | −8.4004e − 001 | −8.5279e − 001 | −8.4417e − 001 | −8.1526e − 001 | −7.6748e − 001 |
| −6.4433e − 001 | −7.3922e − 001 | −8.0283e − 001 | −8.3868e − 001 | −8.4970e − 001 | −8.3719e − 001 | −7.9970e − 001 | −7.3398e − 001 |
| −6.4423e − 001 | −7.3897e − 001 | 8.0283e − 001 | 8.3868e − 001 | 8.4970e − 001 | 8.3719e − 001 | 7.9970e − 001 | 7.3398e − 001 |
| 7.0909e − 001 | 7.7074e − 001 | 8.1745e − 001 | 8.4646e − 001 | 8.5245e − 001 | 8.3830e − 001 | 8.0006e − 001 | 7.6748e − 001 |
| 7.0918e − 001 | 7.7097e − 001 | 8.1802e − 001 | 8.4646e − 001 | 8.5551e − 001 | 8.4525e − 001 | 8.1561e − 001 | 8.2779e − 001 |
| 7.7068e − 001 | 8.6048e − 001 | 9.3505e − 001 | 9.8375e − 001 | 9.9998e − 001 | 9.8161e − 001 | 9.3105e − 001 | 8.2779e − 001 |
| 7.7076e − 001 | 8.6066e − 001 | 9.3540e − 001 | 9.8420e − 001 | 9.9993e − 001 | 9.7907e − 001 | 9.2110e − 001 | 8.5518e − 001 |
| 7.7068e − 001 | 8.6048e − 001 | 9.3505e − 001 | 9.8375e − 001 | 9.9998e − 001 | 9.8161e − 001 | 9.3105e − 001 | 8.5518e − 001 |
| 7.0918e − 001 | 7.7097e − 001 | 8.1802e − 001 | 8.4646e − 001 | 8.5551e − 001 | 8.4525e − 001 | 8.1561e − 001 | 7.6748e − 001 |
| 7.0909e − 001 | 7.7074e − 001 | 8.1745e − 001 | 8.4512e − 001 | 8.5245e − 001 | 8.3830e − 001 | 8.0006e − 001 | 7.3398e − 001 |
| −6.4423e − 001 | −7.3897e − 001 | −8.0283e − 001 | −8.3868e − 001 | −8.4970e − 001 | −8.3719e − 001 | −7.9970e − 001 | −7.3398e − 001 |
| −6.4433e − 001 | −7.3922e − 001 | −8.0343e − 001 | −8.4004e − 001 | −8.5279e − 001 | −8.4417e − 001 | −8.1526e − 001 | −7.6748e − 001 |
| −7.1157e − 001 | −8.3479e − 001 | −9.2592e − 001 | −9.8154e − 001 | −1.000 + 000 | −9.8200e − 001 | −9.3127e − 001 | −8.5518e − 001 |
| −7.1165e − 001 | −8.3499e − 001 | −9.2629e − 001 | −9.8201e − 001 | −9.9998e − 001 | −9.7948e − 001 | −9.2133e − 001 | −8.2779e − 001 |
| −7.0253e − 001 | −5.5026e − 001 | −3.7680e − 001 | −1.8881e − 001 | 6.4830e − 003 | 2.0152e − 001 | 3.8877e − 001 | 5.6103e − 001 |
| −7.0262e − 001 | −5.5057e − 001 | −3.7772e − 001 | −1.9127e − 001 | 6.0168e − 004 | 1.8889e − 001 | 3.6433e − 001 | 5.1833e − 001 |
| −7.6475e − 001 | −6.7346e − 001 | −5.9540e − 001 | −5.4252e − 001 | −5.2226e − 001 | −5.3608e − 001 | −5.7909e − 001 | −6.4108e − 001 |
| −7.6483e − 001 | −6.7373e − 001 | −5.9620e − 001 | −5.4463e − 001 | −5.2727e − 001 | −5.4691e − 001 | −6.0040e − 001 | −6.7917e − 001 |

-continued

| | | | | |
|---|---|---|---|---|
| -7.0512e-001 | -6.3716e-001 | -5.7600e-001 | -5.3457e-001 | -5.2228e-001 | -5.4521e-001 | -5.9992e-001 | -6.7917e-001 |
| -7.0503e-001 | -6.3687e-001 | -5.7519e-001 | -5.3245e-001 | -5.1778e-001 | -5.3437e-001 | -5.7860e-001 | -6.4108e-001 |
| -6.3722e-001 | -5.0949e-001 | -3.5452e-001 | -1.7954e-001 | 5.8449e-003 | 1.9089e-001 | 3.6488e-001 | 5.1833e-001 |
| -6.3713e-001 | -5.0918e-001 | -3.5359e-001 | -1.7707e-001 | 1.1726e-002 | 2.0351e-001 | 3.8932e-001 | 5.6103e-001 |
| 6.3713e-001 | 5.0918e-001 | 3.5359e-001 | 1.7707e-001 | -1.1726e-002 | -2.0351e-001 | -3.8932e-001 | -5.6103e-001 |
| 6.3722e-001 | 5.0949e-001 | 3.5452e-001 | 1.7954e-001 | -5.8449e-003 | -1.9089e-001 | -3.6488e-001 | -5.1833e-001 |
| 7.0503e-001 | 6.3687e-001 | 5.7519e-001 | 5.3245e-001 | 5.1778e-001 | 5.3437e-001 | 5.7860e-001 | 6.4108e-001 |
| 7.0512e-001 | 6.3716e-001 | 5.7600e-001 | 5.3457e-001 | 5.2281e-001 | 5.4521e-001 | 5.9992e-001 | 6.7917e-001 |
| 7.6483e-001 | 6.7373e-001 | 5.9620e-001 | 5.4463e-001 | 5.2281e-001 | 5.4691e-001 | 6.0040e-001 | 6.4108e-001 |
| 7.6475e-001 | 6.7346e-001 | 5.9540e-001 | 5.4252e-001 | 5.2226e-001 | 5.3608e-001 | 5.7909e-001 | 5.1833e-001 |
| 7.0262e-001 | 5.5057e-001 | 3.7772e-001 | 1.9127e-001 | -6.0168e-004 | -1.8889e-001 | -3.6433e-001 | -5.1833e-001 |
| 7.0253e-001 | 5.5026e-001 | 3.7680e-001 | 1.8881e-001 | -6.4830e-003 | -2.0152e-001 | -3.8877e-001 | -5.6103e-001 |
| 7.1165e-001 | 8.3499e-001 | 9.2629e-001 | 9.8201e-001 | 9.9998e-001 | 9.7948e-001 | 9.2133e-001 | 8.2779e-001 |
| 7.1157e-001 | 8.3479e-001 | 9.2592e-001 | 9.8154e-001 | 1.0000e+000 | 9.7970e-001 | 9.3127e-001 | 8.5518e-001 |
| 6.4433e-001 | 7.3922e-001 | 8.0343e-001 | 8.4004e-001 | 8.5279e-001 | 8.4417e-001 | 8.1526e-001 | 7.6748e-001 |
| 6.4423e-001 | 7.3897e-001 | 8.0283e-001 | 8.3868e-001 | 8.4970e-001 | 8.3719e-001 | 7.9970e-001 | 7.3398e-001 |
| -7.0909e-001 | -7.7074e-001 | -8.1745e-001 | -8.4512e-001 | -8.5245e-001 | -8.3830e-001 | -8.0006e-001 | -7.3398e-001 |
| -7.0918e-001 | -7.7097e-001 | -8.1802e-001 | -8.4646e-001 | -8.5551e-001 | -8.4525e-001 | -8.1561e-001 | -7.6748e-001 |
| -7.7068e-001 | -8.6048e-001 | -9.3505e-001 | -9.8375e-001 | -9.9998e-001 | -9.9816e-001 | -9.3105e-001 | -8.5518e-001 |
| -7.7076e-001 | -8.6066e-001 | -9.3540e-001 | -9.8420e-001 | -9.9993e-001 | -9.9907e-001 | -9.2110e-001 | -8.2779e-001 |
| -7.7068e-001 | -8.6048e-001 | -9.3540e-001 | -9.8420e-001 | -9.9993e-001 | -9.7907e-001 | -9.2110e-001 | -8.2779e-001 |
| -7.7068e-001 | -8.6048e-001 | -9.3505e-001 | -9.8375e-001 | -9.9998e-001 | -9.8161e-001 | -9.3105e-001 | -8.5518e-001 |
| -7.0918e-001 | -7.7097e-001 | -8.1802e-001 | -8.4646e-001 | -8.5551e-001 | -8.4525e-001 | -8.1561e-001 | -7.6748e-001 |
| -7.0909e-001 | -7.7074e-001 | -8.1745e-001 | -8.4512e-001 | -8.5245e-001 | -8.3830e-001 | -8.0006e-001 | -7.3398e-001 |
| 6.4423e-001 | 7.3897e-001 | 8.0283e-001 | 8.3868e-001 | 8.4970e-001 | 8.3719e-001 | 7.9970e-001 | 7.3398e-001 |
| 6.4433e-001 | 7.3922e-001 | 8.0343e-001 | 8.4004e-001 | 8.5279e-001 | 8.4417e-001 | 8.1526e-001 | 7.6748e-001 |
| 7.1157e-001 | 8.3479e-001 | 9.2592e-001 | 9.8154e-001 | 1.0000e+000 | 9.8200e-001 | 9.3127e-001 | 8.5518e-001 |
| 7.1165e-001 | 8.3499e-001 | 9.2629e-001 | 9.8201e-001 | 9.9998e-001 | 9.7948e-001 | 9.2133e-001 | 8.2779e-001 |

$I_{corr}$

| | | | | |
|---|---|---|---|---|
| -7.6138e-001 | -8.8612e-001 | -9.7686e-001 | -1.0301e+000 | -1.0436e+000 | -1.0171e+000 | -9.5137e-001 | -8.4915e-001 |
| -7.6121e-001 | -8.8571e-001 | -9.7598e-001 | -1.0285e+000 | -1.0418e+000 | -1.0168e+000 | -9.5787e-001 | -8.7363e-001 |
| -6.6852e-001 | -7.5537e-001 | -8.1150e-001 | -8.4230e-001 | -8.5281e-001 | -8.4525e-001 | -8.1886e-001 | -7.7284e-001 |
| -6.6837e-001 | -7.5501e-001 | -8.1072e-001 | -8.4072e-001 | -8.4970e-001 | -8.3891e-001 | -8.0506e-001 | -7.4207e-001 |
| 7.1846e-001 | 7.7896e-001 | 8.2216e-001 | 8.4634e-001 | 8.5247e-001 | 8.4014e-001 | 8.0538e-001 | 7.4179e-001 |
| 7.1858e-001 | 7.7927e-001 | 8.2288e-001 | 8.4784e-001 | 8.5551e-001 | 8.4645e-001 | 8.1921e-001 | 7.7271e-001 |
| 7.9606e-001 | 8.9503e-001 | 9.7550e-001 | 1.0259e+000 | 1.0397e+000 | 1.0158e+000 | 9.5778e-001 | 8.7402e-001 |
| 7.9619e-001 | 8.9538e-001 | 9.7630e-001 | 1.0273e+000 | 1.0415e+000 | 1.0161e+000 | 9.5136e-001 | 8.4978e-001 |
| 7.9662e-001 | 8.9580e-001 | 9.7662e-001 | 1.0275e+000 | 1.0415e+000 | 1.0158e+000 | 9.5089e-001 | 8.4910e-001 |
| 7.9648e-001 | 8.9544e-001 | 9.7583e-001 | 1.0260e+000 | 1.0397e+000 | 1.0156e+000 | 9.5740e-001 | 8.7357e-001 |
| 7.1879e-001 | 7.7943e-001 | 8.2296e-001 | 8.4787e-001 | 8.5551e-001 | 8.4647e-001 | 8.1930e-001 | 7.7287e-001 |
| 7.1867e-001 | 7.7912e-001 | 8.2224e-001 | 8.4636e-001 | 8.5247e-001 | 8.4018e-001 | 8.0552e-001 | 7.4211e-001 |
| -6.6786e-001 | -7.5470e-001 | -8.1058e-001 | -8.4068e-001 | -8.4970e-001 | -8.3887e-001 | -8.0492e-001 | -7.4176e-001 |
| -6.6801e-001 | -7.5506e-001 | -8.1136e-001 | -8.4226e-001 | -8.5281e-001 | -8.4523e-001 | -8.1878e-001 | -7.7267e-001 |
| -7.6043e-001 | -8.8510e-001 | -9.7558e-001 | -1.0284e+000 | -1.0418e+000 | -1.0170e+000 | -9.5825e-001 | -8.7409e-001 |
| -7.6059e-001 | -8.8551e-001 | -9.7645e-001 | -1.0299e+000 | -1.0437e+000 | -1.0173e+000 | -9.5185e-001 | -8.4983e-001 |
| -7.1442e-001 | -5.5221e-001 | -3.6873e-001 | -1.7101e-001 | 3.3321e-002 | 2.3635e-001 | 4.3024e-001 | 6.0753e-001 |
| -7.1451e-001 | -5.5257e-001 | -3.6989e-001 | -1.7424e-001 | 2.5386e-002 | 2.1901e-001 | 3.9638e-001 | 5.4831e-001 |
| -7.7626e-001 | -6.7993e-001 | -5.9855e-001 | -5.4353e-001 | -5.2227e-001 | -5.3691e-001 | -5.8281e-001 | -6.4845e-001 |
| -7.7632e-001 | -6.8018e-001 | -5.9931e-001 | -4.4556e-001 | -5.2227e-001 | -5.4834e-001 | -6.0689e-001 | -6.9427e-001 |
| -7.7043e-001 | -6.4108e-001 | -5.7815e-001 | -5.3520e-001 | -5.2282e-001 | -5.4685e-001 | -6.0676e-001 | -6.9471e-001 |
| -7.1035e-001 | -6.4082e-001 | -5.7738e-001 | -5.3314e-001 | -5.1778e-001 | -5.3535e-001 | -5.8257e-001 | -6.4871e-001 |

| | | | | | |
|---|---|---|---|---|---|
| -6.4474e − 001 | -5.1237e − 001 | -3.4966e − 001 | -1.6567e − 001 | 2.8055e − 002 | 2.1914e − 001 | 3.9564e − 001 | 5.4744e − 001 |
| -6.4465e − 001 | -5.1203e − 001 | -3.4855e − 001 | -1.6252e − 001 | 3.5861e − 002 | 2.3630e − 001 | 4.2927e − 001 | 6.0638e − 001 |
| -6.4412e − 001 | -5.1128e − 001 | -3.4762e − 001 | -1.6147e − 001 | -3.6974e − 002 | -2.3741e − 001 | -4.3032e − 001 | -6.0732e − 001 |
| -6.4421e − 001 | -5.1163e − 001 | -3.4875e − 001 | -1.6464e − 001 | -2.9120e − 002 | -2.2016e − 001 | -3.9654e − 001 | -5.4815e − 001 |
| -7.1014e − 001 | -6.4062e − 001 | -5.7726e − 001 | -5.3311e − 001 | -5.1778e − 001 | -5.3531e − 001 | -5.8244e − 001 | -6.4852e − 001 |
| -7.1022e − 001 | -6.4088e − 001 | -5.7803e − 001 | -5.3516e − 001 | -5.2282e − 001 | -5.4679e − 001 | -6.0657e − 001 | -6.9438e − 001 |
| -7.7676e − 001 | -6.8052e − 001 | -5.9950e − 001 | -5.4561e − 001 | -5.2727e − 001 | -5.4839e − 001 | -6.0708e − 001 | -6.9460e − 001 |
| -7.7670e − 001 | -6.8027e − 001 | -5.9874e − 001 | -5.4359e − 001 | -5.2228e − 001 | -5.3695e − 001 | -5.8293e − 001 | -6.4864e − 001 |
| -7.1536e − 001 | -5.5356e − 001 | -3.7097e − 001 | -1.7536e − 001 | -2.4273e − 002 | -2.1797e − 001 | -3.9548e − 001 | -5.4759e − 001 |
| -7.1527e − 001 | -5.5320e − 001 | -3.6982e − 001 | -1.7216e − 001 | -3.2161e − 002 | -2.3522e − 001 | -4.2918e − 001 | -6.0659e − 001 |
| -7.6138e − 001 | -8.8612e − 001 | -9.9766e − 001 | -1.0301e + 000 | -1.0436e + 000 | -1.0171e + 000 | -9.5137e − 001 | -8.4915e − 001 |
| -7.6121e − 001 | -8.8571e − 001 | -9.7598e − 001 | -1.0285e + 000 | -1.0418e + 000 | -1.0168e + 000 | -9.5787e − 001 | -8.7363e − 001 |
| -6.6852e − 001 | -7.5537e − 001 | -8.1150e − 001 | -8.4230e − 001 | -8.5281e − 001 | -8.4525e − 001 | -8.1886e − 001 | -7.7284e − 001 |
| -6.6837e − 001 | -7.5501e − 001 | -8.1072e − 001 | -8.4072e − 001 | -8.4970e − 001 | -8.3891e − 001 | -8.0506e − 001 | -7.4207e − 001 |
| -7.1846e − 001 | -7.7896e − 001 | -8.2216e − 001 | -8.4634e − 001 | -8.5247e − 001 | -8.4014e − 001 | -8.0538e − 001 | -7.4179e − 001 |
| -7.1858e − 001 | -7.7927e − 001 | -8.2288e − 001 | -8.4784e − 001 | -8.5551e − 001 | -8.4645e − 001 | -8.1921e − 001 | -7.7271e − 001 |
| -7.9606e − 001 | -8.9503e − 001 | -9.7550e − 001 | -1.0259e + 000 | -1.0397e + 000 | -1.0158e + 000 | -9.5778e − 001 | -8.7402e − 001 |
| -7.9619e − 001 | -8.9538e − 001 | -9.7630e − 001 | -1.0273e + 000 | -1.0415e + 000 | -1.0161e + 000 | -9.5136e − 001 | -8.4998e − 001 |
| -7.9662e − 001 | -8.9580e − 001 | -9.7662e − 001 | -1.0275e + 000 | -1.0415e + 000 | -1.0158e + 000 | -9.5089e − 001 | -8.4910e − 001 |
| -7.9648e − 001 | -8.9544e − 001 | -9.7583e − 001 | -1.0260e + 000 | -1.0397e + 000 | -1.0156e + 000 | -9.5740e − 001 | -8.7357e − 001 |
| -7.1879e − 001 | -7.7943e − 001 | -8.2296e − 001 | -8.4787e − 001 | -8.5551e − 001 | -8.4647e − 001 | -8.1930e − 001 | -7.7287e − 001 |
| -7.1867e − 001 | -7.7912e − 001 | -8.2224e − 001 | -8.4636e − 001 | -8.5247e − 001 | -8.4018e − 001 | -8.0552e − 001 | -7.4211e − 001 |
| -6.6786e − 001 | -7.5470e − 001 | -8.1058e − 001 | -8.4068e − 001 | -8.4970e − 001 | -8.3887e − 001 | -8.0492e − 001 | -7.4176e − 001 |
| -6.6801e − 001 | -7.5506e − 001 | -8.1136e − 001 | -8.4226e − 001 | -8.5281e − 001 | -8.4523e − 001 | -8.1878e − 001 | -7.7267e − 001 |
| -7.6043e − 001 | -8.8510e − 001 | -9.7558e − 001 | -1.0284e + 000 | -1.0418e + 000 | -1.0170e + 000 | -9.5825e − 001 | -8.7409e − 001 |
| -7.6059e − 001 | -8.8551e − 001 | -9.7645e − 001 | -1.0299e + 000 | -1.0437e + 000 | -1.0173e + 000 | -9.5185e − 001 | -8.4983e − 001 |
| -7.1442e − 001 | -5.5221e − 001 | -3.6873e − 001 | -1.7101e − 001 | -3.3321e − 002 | -2.3635e − 001 | -4.3024e − 001 | -6.0753e − 001 |
| -7.1451e − 001 | -5.5257e − 001 | -3.6989e − 001 | -1.7424e − 001 | -2.5386e − 002 | -2.1901e − 001 | -3.9638e − 001 | -5.4831e − 001 |
| -7.7626e − 001 | -6.7993e − 001 | -5.9855e − 001 | -5.4353e − 001 | -5.2227e − 001 | -5.3691e − 001 | -5.8281e − 001 | -6.4845e − 001 |
| -7.7632e − 001 | -6.8018e − 001 | -5.9931e − 001 | -5.4556e − 001 | -5.2727e − 001 | -5.4834e − 001 | -6.0689e − 001 | -6.9427e − 001 |
| -7.1043e − 001 | -6.4108e − 001 | -5.7815e − 001 | -5.3520e − 001 | -5.2282e − 001 | -5.4685e − 001 | -6.0676e − 001 | -6.9471e − 001 |
| -7.1035e − 001 | -6.4082e − 001 | -5.7738e − 001 | -5.3314e − 001 | -5.1778e − 001 | -5.3535e − 001 | -5.8257e − 001 | -6.4871e − 001 |
| -6.4474e − 001 | -5.1237e − 001 | -3.4966e − 001 | -1.6567e − 001 | 2.4273e − 002 | 2.1797e − 001 | 3.9564e − 001 | 5.4744e − 001 |
| -6.4465e − 001 | -5.1203e − 001 | -3.4855e − 001 | -1.6252e − 001 | 3.2161e − 002 | 2.3522e − 001 | 4.2927e − 001 | 6.0638e − 001 |
| -6.4412e − 001 | -5.1128e − 001 | -3.4762e − 001 | -1.6147e − 001 | -3.6974e − 002 | -2.3741e − 001 | -4.3032e − 001 | -6.0732e − 001 |
| -6.4421e − 001 | -5.1163e − 001 | -3.4875e − 001 | -1.6464e − 001 | -2.9120e − 002 | -2.2016e − 001 | -3.9654e − 001 | -5.4815e − 001 |
| -7.1014e − 001 | -6.4062e − 001 | -5.7726e − 001 | -5.3311e − 001 | -5.1778e − 001 | -5.3531e − 001 | -5.8244e − 001 | -6.4852e − 001 |
| -7.1022e − 001 | -6.4088e − 001 | -5.7803e − 001 | -5.3516e − 001 | -5.2282e − 001 | -5.4679e − 001 | -6.0657e − 001 | -6.9438e − 001 |
| -7.7676e − 001 | -6.8052e − 001 | -5.9950e − 001 | -5.4561e − 001 | -5.2727e − 001 | -5.4839e − 001 | -6.0708e − 001 | -6.9460e − 001 |
| -7.7670e − 001 | -6.8027e − 001 | -5.9874e − 001 | -5.4359e − 001 | -5.2228e − 001 | -5.3695e − 001 | -5.8293e − 001 | -6.4864e − 001 |
| -7.1536e − 001 | -5.5356e − 001 | -3.7097e − 001 | -1.7536e − 001 | -2.8055e − 002 | -2.1914e − 001 | -3.9548e − 001 | -5.4759e − 001 |
| -7.1527e − 001 | -5.5320e − 001 | -3.6982e − 001 | -1.7216e − 001 | -3.5861e − 002 | -2.3522e − 001 | -4.2918e − 001 | -6.0659e − 001 |

$Q_{corr}$

| | | | | | | | |
|---|---|---|---|---|---|---|---|
| 7.1442e − 001 | 5.5221e − 001 | 3.6873e − 001 | 1.7101e − 001 | -3.3321e − 002 | -2.3635e − 001 | -4.3024e − 001 | -6.0753e − 001 |
| 7.1451e − 001 | 5.5257e − 001 | 3.6989e − 001 | 1.7424e − 001 | -2.5386e − 002 | -2.1901e − 001 | -3.9638e − 001 | -5.4831e − 001 |
| 7.7626e − 001 | 6.7993e − 001 | 5.9855e − 001 | 5.4353e − 001 | 5.2227e − 001 | 5.3691e − 001 | 5.8281e − 001 | 6.4845e − 001 |
| 7.7632e − 001 | 6.8018e − 001 | 5.9931e − 001 | 5.4556e − 001 | 5.2727e − 001 | 5.4834e − 001 | 6.0689e − 001 | 6.9427e − 001 |
| 7.1043e − 001 | 6.4108e − 001 | 5.7815e − 001 | 5.3520e − 001 | 5.2282e − 001 | 5.4685e − 001 | 6.0676e − 001 | 6.9471e − 001 |
| 7.1035e − 001 | 6.4082e − 001 | 5.7738e − 001 | 5.3314e − 001 | 5.1778e − 001 | 5.3535e − 001 | 5.8257e − 001 | 6.4871e − 001 |
| 7.7676e − 001 | 6.8052e − 001 | 5.9950e − 001 | 5.4561e − 001 | 5.2727e − 001 | 5.4839e − 001 | 6.0708e − 001 | 6.9460e − 001 |
| 6.4474e − 001 | 5.1237e − 001 | 3.4966e − 001 | 1.6567e − 001 | -2.8055e − 002 | -2.1914e − 001 | -3.9564e − 001 | -5.4744e − 001 |
| 6.4465e − 001 | 5.1203e − 001 | 3.4855e − 001 | 1.6252e − 001 | -3.5861e − 002 | -2.3630e − 001 | -4.2918e − 001 | -6.0638e − 001 |

-continued

| | | | | |
|---|---|---|---|---|
| −6.4412e − 001 | −5.1128e − 001 | −3.4762e − 001 | −1.6147e − 001 | 3.6974e − 002 | 2.3741e − 001 | 4.3032e − 001 | 6.0732e − 001 |
| −6.4421e − 001 | −5.1163e − 001 | −3.4875e − 001 | −1.6464e − 001 | 2.9120e − 002 | 2.2016e − 001 | 3.9654e − 001 | 5.4815e − 001 |
| −7.1014e − 001 | −6.4062e − 001 | −5.7726e − 001 | −5.3311e − 001 | −5.1778e − 001 | −5.3531e − 001 | −5.8244e − 001 | −6.4852e − 001 |
| −7.1022e − 001 | −6.4088e − 001 | −5.7803e − 001 | −5.3516e − 001 | −5.2282e − 001 | −5.4679e − 001 | −6.0657e − 001 | −6.9438e − 001 |
| −7.7676e − 001 | −6.8052e − 001 | −5.9950e − 001 | −5.4561e − 001 | −5.2282e − 001 | −5.4839e − 001 | −6.0708e − 001 | −6.9460e − 001 |
| −7.7670e − 001 | −6.8027e − 001 | −5.9874e − 001 | −5.4359e − 001 | −5.2228e − 001 | −5.3695e − 001 | −5.8293e − 001 | −6.4864e − 001 |
| −7.1536e − 001 | −5.5356e − 001 | −3.7097e − 001 | −1.7536e − 001 | 2.4273e − 002 | 2.1797e − 001 | 3.9548e − 001 | 5.4759e − 001 |
| −7.1527e − 001 | −5.5320e − 001 | −3.6982e − 001 | −1.7216e − 001 | 3.2161e − 002 | 2.3522e − 001 | 4.2918e − 001 | 6.0659e − 001 |
| −7.6138e − 001 | −8.8612e − 001 | −9.7686e − 001 | −1.0436e + 000 | −1.0171e + 000 | −9.5137e − 001 | −8.4915e − 001 |
| −7.6121e − 001 | −8.8571e − 001 | −9.7598e − 001 | −1.0285e + 000 | −1.0418e + 000 | −1.0168e + 000 | −9.5787e − 001 | −8.7363e − 001 |
| −6.6852e − 001 | −7.5537e − 001 | −8.1150e − 001 | −8.4230e − 001 | −8.4525e − 001 | −8.1886e − 001 | −7.7284e − 001 |
| −6.6837e − 001 | −7.5501e − 001 | −8.1072e − 001 | −8.4072e − 001 | −8.4970e − 001 | −8.3891e − 001 | −8.0506e − 001 | −7.4207e − 001 |
| 7.1846e − 001 | 7.7896e − 001 | 8.2216e − 001 | 8.4634e − 001 | 8.5551e − 001 | 8.4645e − 001 | 8.1921e − 001 | 7.7177e − 001 |
| 7.1858e − 001 | 7.7927e − 001 | 8.2288e − 001 | 8.4784e − 001 | 8.5551e − 001 | 1.0159e + 000 | 8.5778e − 001 | 8.7402e − 001 |
| 7.9606e − 001 | 8.9503e − 001 | 9.7550e − 001 | 1.0259e + 000 | 1.0397e + 000 | 1.0161e + 000 | 9.5136e − 001 | 8.4978e − 001 |
| 7.9619e − 001 | 8.9538e − 001 | 9.7630e − 001 | 1.0273e + 000 | 1.0415e + 000 | 1.0158e + 000 | 9.5089e − 001 | 8.4910e − 001 |
| 7.9662e − 001 | 8.9580e − 001 | 9.7662e − 001 | 1.0275e + 000 | 1.0415e + 000 | 1.0156e + 000 | 9.5740e − 001 | 8.7357e − 001 |
| 7.9648e − 001 | 8.9544e − 001 | 9.7583e − 001 | 1.0260e + 000 | 1.0397e + 000 | 8.4647e − 001 | 8.1930e − 001 | 7.7287e − 001 |
| 7.1879e − 001 | 7.7943e − 001 | 8.2296e − 001 | 8.4787e − 001 | 8.5551e − 001 | 8.4018e − 001 | 8.0552e − 001 | 7.4211e − 001 |
| 7.1867e − 001 | 7.7912e − 001 | 8.2224e − 001 | 8.4636e − 001 | 8.5247e − 001 | −8.3887e − 001 | −7.4176e − 001 |
| −6.6786e − 001 | −7.5470e − 001 | −8.1058e − 001 | −8.4068e − 001 | −8.4970e − 001 | −8.0492e − 001 | −8.1878e − 001 | −7.7267e − 001 |
| −6.6801e − 001 | −7.5506e − 001 | −8.1136e − 001 | −8.4226e − 001 | −8.5281e − 001 | −8.4523e − 001 | −9.5825e − 001 | −8.7409e − 001 |
| −7.6043e − 001 | −8.8510e − 001 | −9.7558e − 001 | −1.0284e + 000 | −1.0418e + 000 | −1.0170e + 000 | −9.5185e − 001 | −8.4983e − 001 |
| −7.6059e − 001 | −8.8551e − 001 | −9.7645e − 001 | −1.0299e + 000 | −1.0437e + 000 | −1.0173e + 000 | 4.3024e − 001 | 6.0753e − 001 |
| −7.1451e − 001 | −5.5221e − 001 | −3.6873e − 001 | −1.7101e − 001 | 3.3321e − 002 | 2.3635e − 001 | 3.9638e − 001 | 5.4831e − 001 |
| −7.1424e − 001 | −5.5257e − 001 | −3.6989e − 001 | −1.7424e − 001 | 2.5386e − 002 | 2.1901e − 001 | −5.8281e − 001 | −6.4845e − 001 |
| −7.7626e − 001 | −6.7993e − 001 | −5.9855e − 001 | −5.4353e − 001 | −5.2227e − 001 | −5.3691e − 001 | −5.6089e − 001 | −6.9427e − 001 |
| −7.7632e − 001 | −6.8018e − 001 | −5.9931e − 001 | −5.4556e − 001 | −5.2727e − 001 | −5.4834e − 001 | −6.0676e − 001 | −6.9471e − 001 |
| −7.1043e − 001 | −6.4108e − 001 | −5.7815e − 001 | −5.3520e − 001 | −5.2282e − 001 | −5.4685e − 001 | −5.8257e − 001 | −6.4871e − 001 |
| −7.1035e − 001 | −6.4082e − 001 | −5.7738e − 001 | −5.3314e − 001 | −5.1778e − 001 | −5.3535e − 001 | 3.9564e − 001 | 5.4744e − 001 |
| −6.4474e − 001 | −5.1237e − 001 | −3.4966e − 001 | −1.6567e − 001 | 2.8055e − 002 | 2.1914e − 001 | 4.2927e − 001 | 6.0638e − 001 |
| −6.4465e − 001 | −5.1203e − 001 | −3.4855e − 001 | −1.6252e − 001 | 3.5861e − 002 | 2.3630e − 001 | −4.3032e − 001 | −6.0732e − 001 |
| 6.4421e − 001 | 5.1128e − 001 | 3.4762e − 001 | 1.6147e − 001 | −3.6974e − 002 | −2.3741e − 001 | −3.9654e − 001 | −5.4815e − 001 |
| 6.4412e − 001 | 5.1163e − 001 | 3.4875e − 001 | 1.6464e − 001 | −2.9120e − 002 | −2.2016e − 001 | 5.8244e − 001 | 6.4852e − 001 |
| 7.1014e − 001 | 6.4062e − 001 | 5.7726e − 001 | 5.3311e − 001 | 5.1778e − 001 | 5.3531e − 001 | 6.0657e − 001 | 6.9438e − 001 |
| 7.1022e − 001 | 6.4088e − 001 | 5.7803e − 001 | 5.3516e − 001 | 5.2282e − 001 | 5.4679e − 001 | 6.0708e − 001 | 6.9460e − 001 |
| 7.7676e − 001 | 6.8052e − 001 | 5.9950e − 001 | 5.4561e − 001 | 5.2282e − 001 | 5.4839e − 001 | 5.8293e − 001 | 6.4864e − 001 |
| 7.7670e − 001 | 6.8027e − 001 | 5.9874e − 001 | 5.4359e − 001 | 5.2228e − 001 | 5.3695e − 001 | 3.9548e − 001 | 5.4759e − 001 |
| 7.1536e − 001 | 5.5356e − 001 | 3.7097e − 001 | 1.7536e − 001 | −2.4273e − 002 | −2.1797e − 001 | −4.2918e − 001 | −6.0659e − 001 |
| 7.1527e − 001 | 5.5320e − 001 | 3.6982e − 001 | 1.7216e − 001 | −3.2161e − 002 | −2.3522e − 001 | 9.5137e − 001 | 8.4915e − 001 |
| 7.6138e − 001 | 8.8612e − 001 | 9.7686e − 001 | 1.0301e + 000 | 1.0436e + 000 | 1.0171e + 000 | 9.5787e − 001 | 8.7363e − 001 |
| 7.6121e − 001 | 8.8571e − 001 | 9.7598e − 001 | 1.0285e + 000 | 1.0418e + 000 | 1.0168e + 000 | 8.1886e − 001 | 7.7284e − 001 |
| 6.6852e − 001 | 7.5537e − 001 | 8.1150e − 001 | 8.4230e − 001 | 8.4525e − 001 | 8.3891e − 001 | 8.0506e − 001 | 7.4207e − 001 |
| 6.6837e − 001 | 7.5501e − 001 | 8.1072e − 001 | 8.4072e − 001 | 8.4970e − 001 | −8.4014e − 001 | −8.1921e − 001 | −7.7271e − 001 |
| −7.1846e − 001 | −7.7896e − 001 | −8.2216e − 001 | −8.4634e − 001 | −8.5551e − 001 | −8.4645e − 001 | −9.5778e − 001 | −8.7402e − 001 |
| −7.1858e − 001 | −7.7927e − 001 | −8.2288e − 001 | −8.4784e − 001 | −8.5551e − 001 | −1.0397e + 000 | −9.5136e − 001 | −8.4978e − 001 |
| −7.9606e − 001 | −8.9503e − 001 | −9.7550e − 001 | −1.0259e + 000 | −1.0397e + 000 | −1.0161e + 000 | −9.5089e − 001 | −8.4910e − 001 |
| −7.9619e − 001 | −8.9538e − 001 | −9.7630e − 001 | −1.0273e + 000 | −1.0415e + 000 | −1.0158e + 000 | −9.5740e − 001 | −8.7357e − 001 |
| −7.9662e − 001 | −8.9580e − 001 | −9.7662e − 001 | −1.0275e + 000 | −1.0415e + 000 | −1.0156e + 000 | −8.1930e − 001 | −8.7357e − 001 |
| −7.9648e − 001 | −8.9544e − 001 | −9.7583e − 001 | −1.0260e + 000 | −1.0397e + 000 | −8.4647e − 001 | −8.0552e − 001 | −7.7287e − 001 |
| −7.1879e − 001 | −7.7943e − 001 | −8.2296e − 001 | −8.4787e − 001 | −8.5551e − 001 | −8.4018e − 001 | −8.0552e − 001 | −7.4211e − 001 |
| −7.1867e − 001 | −7.7912e − 001 | −8.2224e − 001 | −8.4636e − 001 | −8.5247e − 001 | −8.3887e − 001 | 8.0492e − 001 | 7.4176e − 001 |
| 6.6786e − 001 | 7.5470e − 001 | 8.1058e − 001 | 8.4068e − 001 | 8.3887e − 001 | | | |

-continued

| | | | | | | |
|---|---|---|---|---|---|---|
| 6.6801e − 001 | 7.5506e − 001 | 8.1136e − 001 | 8.4226e − 001 | 8.5281e − 001 | 8.4523e − 001 | 8.1878e − 001 | 7.7267e − 001 |
| 7.6043e − 001 | 8.8510e − 001 | 9.7558e − 001 | 1.0284e + 000 | 1.0418e + 000 | 1.0170e + 000 | 9.5825e − 001 | 8.7409e − 001 |
| 7.6059e − 001 | 8.8551e − 001 | 9.7645e − 001 | 1.0299e + 000 | 1.0437e + 000 | 1.0173e + 000 | 9.5185e − 001 | 8.4983e − 001 |

I claim:

1. A method for compensating the dependence of a transmitter output signal on a distorting transfer function, having both amplitude and phase, of a combiner filter in a mobile radio communication system, comprising the steps of:

converting digital signals into analog baseband signals;

compensating said analog baseband signals in a compensating filter having a transfer function, having both amplitude and phase, that approximates the reciprocal of said combiner transfer function after frequency transformation to a baseband;

modulating a carrier signal with said compensated analog baseband signals;

amplifying said modulated carrier signal; and filtering said amplified modulated carrier signal in said combiner filter to produce said transmitter output signal.

2. A method for compensating the dependence of a transmitter output signal on a distorting transfer function, having both amplitude and phase, of a combiner filter in a mobile radio communication system, comprising the steps of:

converting binary signals into sequences of digital signals, said conversion including compensating said digital signals for the distorting effects of said combiner transfer function after frequency transformation to a baseband;

converting said digital signals into analog baseband signals;

modulating a carrier signal with said compensated analog baseband signals;

amplifying said modulated carrier signal; and filtering said amplified modulated carrier signal in said combiner filter to produce said transmitter output signal.

3. The method according to claim 2, wherein said compensating step comprises choosing distortion compensated sequences of digital signals from conversion tables.

4. A method for compensating the dependence of a transmitter output signal on a distorting transfer function, having both amplitude and phase, of a combiner filter in a transmitter operating in a mobile radio communication system, comprising the steps of:

converting binary signals into sequences of digital signals, said conversion including compensating said digital signals for phase distorting effects of said combiner transfer function after frequency transformation to a baseband;

converting said digital signals into analog baseband signals;

modulating a carrier signal with said compensated analog baseband signals;

amplifying said modulated carrier signal, said amplification including compensating said digital signals for amplitude distorting effects of said combiner transfer function after frequency transformation to said baseband; and filtering said amplified modulated carrier signal in said combiner filter to produce said transmitter output signal.

5. The method according to claim 4, wherein said phase compensating step comprises choosing phase distortion compensated sequences of digital signals from conversion tables.

6. The method according to claim 5, wherein said amplitude compensating step comprises controlling the amplification of a final amplification stage of said transmitter.

* * * * *